April 28, 1964

C. J. KINSEY ETAL 3,130,587

UNBALANCE MEASURING APPARATUS

Filed Feb. 23, 1961

INVENTORS
Claude J. Kinsey &
BY William J. Volke

Robert B. Gerhardt

ATTORNEY

April 28, 1964     C. J. KINSEY ETAL     3,130,587
UNBALANCE MEASURING APPARATUS
Filed Feb. 23, 1961                                3 Sheets-Sheet 3

INVENTORS
Claude J. Kinsey &
BY William J. Volke
Robert B. Gerhardt
ATTORNEY

United States Patent Office 3,130,587
Patented Apr. 28, 1964

3,130,587
UNBALANCE MEASURING APPARATUS
Claude J. Kinsey and William J. Volke, Detroit, Mich., assignors to General Motors Corporation, Detroit, Mich., a corporation of Delaware
Filed Feb. 23, 1961, Ser. No. 91,002
2 Claims. (Cl. 73—462)

This invention relates to apparatus for determining dynamic and static unbalance in rotating members and more particularly to apparatus for determining the value and position of correction weights necessary to dynamically and statically balance rotatable members such as wheel and tire assemblies.

Conventional dynamic unbalance determining apparatus employ vibration pickup devices located in spaced planes normal to the axis of rotation. By determining the amplitude of vibration of the workpiece in the two measuring planes either by direct measurement on the workpiece or on the nodal bar connected to the workpiece support, it is possible to compute the amount and location of balancing weights that must be applied to correct for both dynamic and static unbalance. Where the workpiece is relatively short along its axis of rotation, e.g., in a wheel and tire assembly, this two plane method, while useful for relatively long rotating members, is difficult to use in determining unbalance in short members such as wheels.

It therefore is an object of this invention to provide an apparatus wherein both the dynamic and static unbalance of a workpiece may be determined simultaneously through measurement of vibration in a single plane.

A further object is to provide apparatus wherein a rotating workpiece is supported by a suspension arranged so that one vibration pickup will respond solely to static unbalance forces and a second pickup will respond only to dynamic unbalance forces.

A still further object is to provide apparatus wherein the output of a static unbalance response pickup and a dynamic unbalance pickup are combined to provide direct indication of correction necessary in two correction planes to statically and dynamically balance the workpiece. These and other objects and advantages will be apparent from the following description and drawings which illustrate one example and in which.

Figure 1:
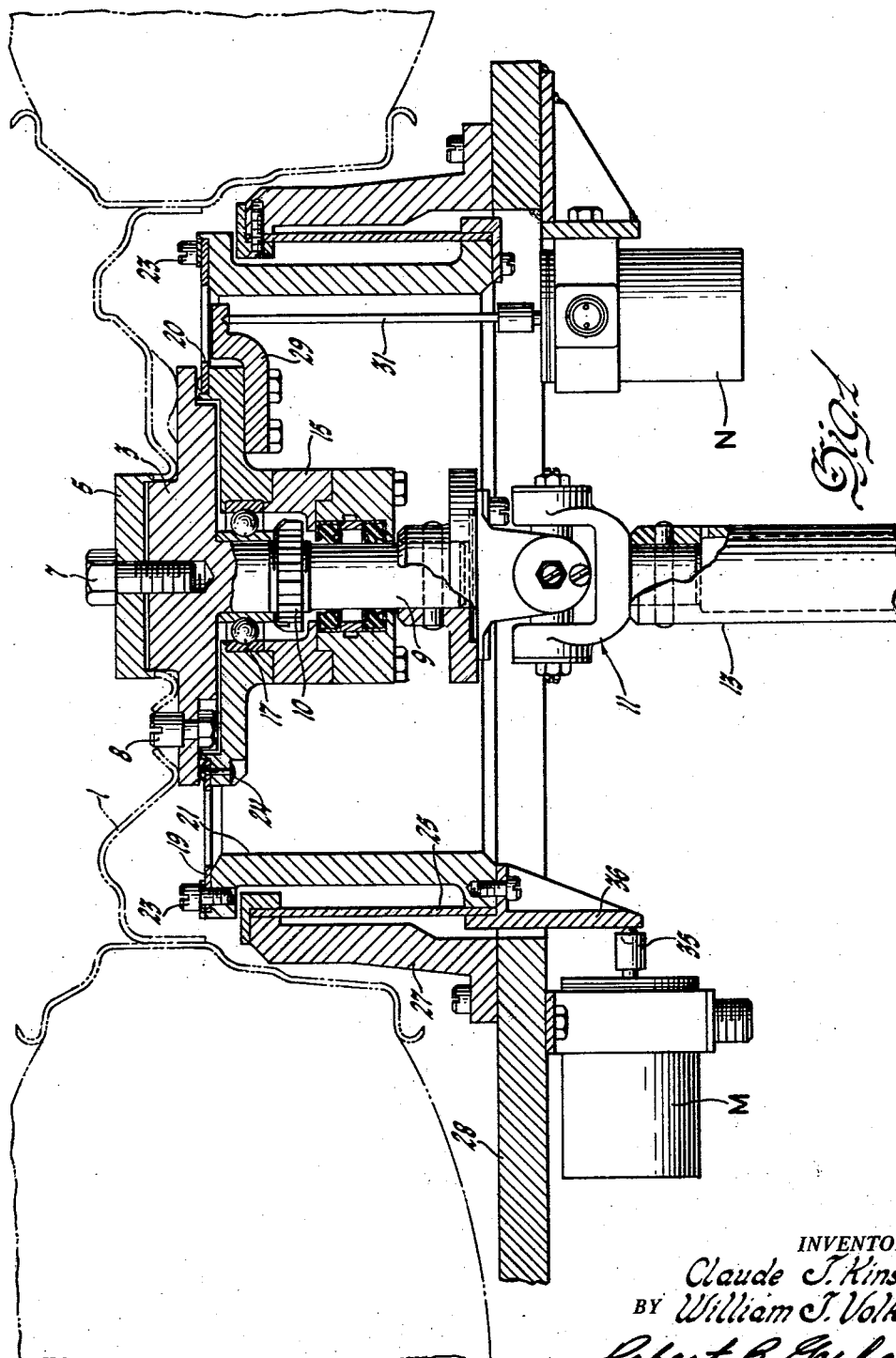
FIGURE 1 is a cross-sectional view of the unbalance measuring apparatus with a workpiece thereon.
Figure 2:
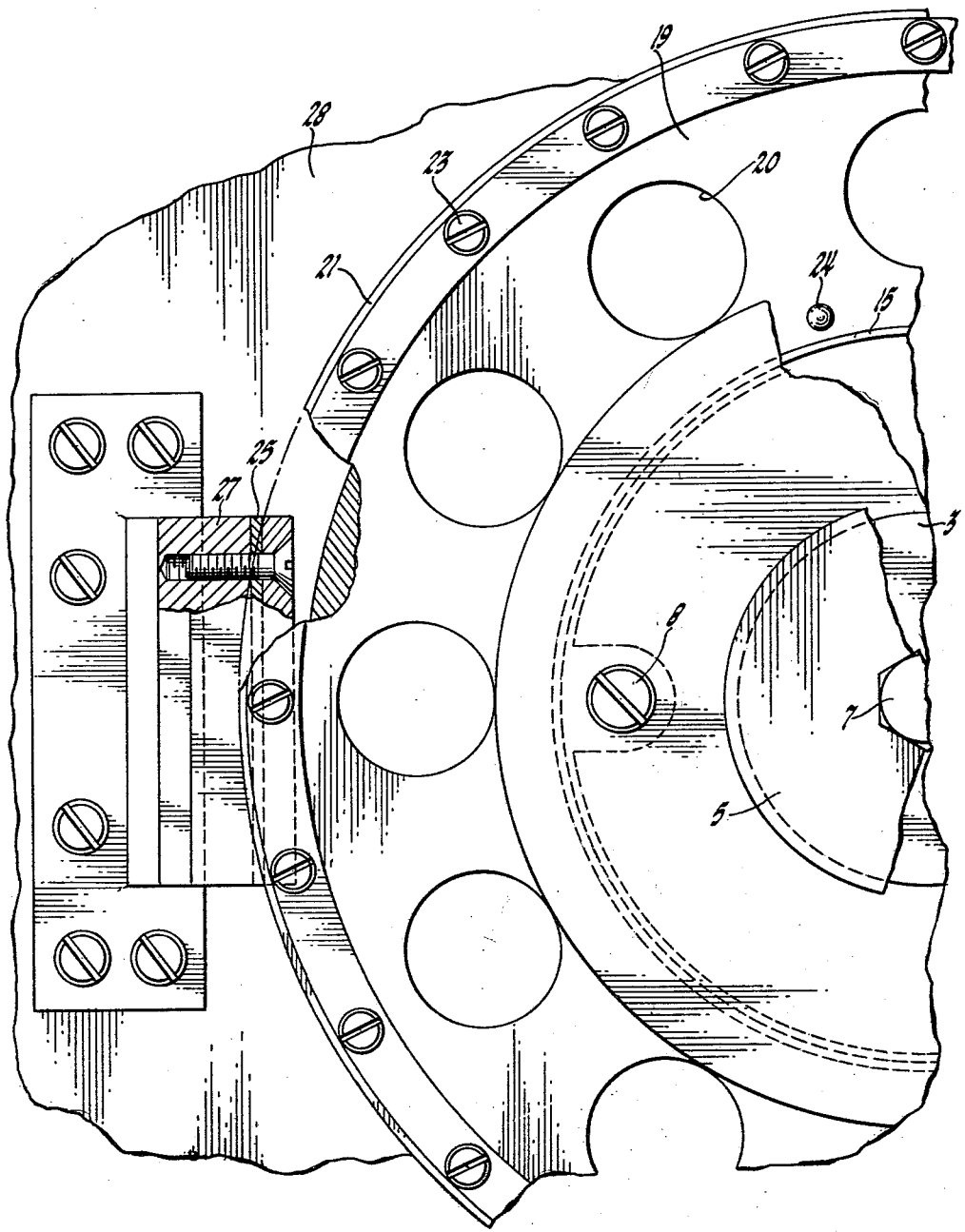
FIGURE 2 is an enlarged view of a portion of the apparatus of FIGURE 1 looking down on the same.

Referring to FIGURES 1 and 2 which show one form that an apparatus constructed in accordance with the invention might take. It will be seen that the workpiece, in this case a wheel and tire assembly 1, is positioned on an adapter 3 and secured thereto by a clamp 5 and bolt 7. A drive pin 8 carried by the adapter 3 is provided to insure uniform rotation and alignment of the workpiece and adapter. The adapter 3 has an extension drive shaft 9 which is connected through a double yoke universal joint, generally indicated 11, to a second drive shaft 13 connected to any suitable drive motor, not shown.

The adapter 3 is rotatably journalled in a support member 15 by ball bearing assembly 17 secured by a nut 10. The support 15 is suspended by a diaphragm member 19 having circular cutouts 20 to increase the flexibility of the diaphragm 19. The outer edge of the circular diaphragm 19 is fastened by bolts 23 to an annular non-flexible mounting ring 21 and fastened at its inner end to the support 15 by rivets 24. The ring 21 is supported by a pair of flat vertical springs 25 which are rigidly fastened at their upper ends, as seen in the figures to flanged support members 27 in turn secured to a solid apparatus base 28.

The support member 15 carries an extension piece 29 which is engaged by a probe 31 of a dynamic unbalance vibration pickup N which is attached to the base 28. A second vibration pickup M is a static unbalance responsive pickup that has a probe 35 contacting an extension piece 36 connected to the diaphragm supporting ring 21.

It should be noted that the diaphragm 19 is located in a plane as close as possible to the normal center of gravity or mass of the workpiece. The plane of diaphragm 19 is normally perpendicular to the axis of rotation of the workpiece 1. Any vibration force due to static unbalance in the workpiece will then be transmitted radially through the transversely rigid diaphragm 19, the ring 21 and will cause displacement of the probe 35 of pickup M. This static unbalance force will have substantially no effect on the probe 31 of the pickup N since it causes no vertical movement of the support 15 and its extension 29.

Dynamic unbalance in the workpiece, such as the wheel and tire assembly, will cause the same to pivot about the geometric center until the mass or center of gravity is located in the plane normal to the axis of rotation and passing through the geometric center. This will appear as a pivoting or wobbling of the wheel with the flexing of diaphragm 19. The pivoting or tilt of support 15 will cause a vertical reciprocating movement of the probe 31 of the pickup N. This wobbling or tilting movement will have no effect on the pickup M, which is responsive only to transverse or radial movement.

Figure 3:
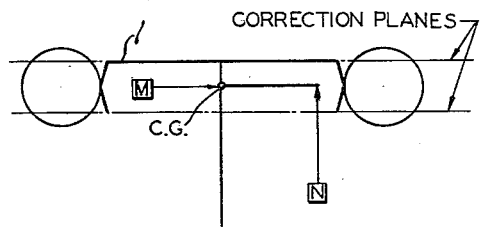
FIGURE 3 is a diagrammatic illustration of the system employed for measuring static and dynamic unbalance of a wheel and tire simultaneously.

FIGURE 3 illustrates diagrammatically the measuring system included in the invention and of which FIGURES 1 and 2 illustrate a specific application thereof. The static pickup M is arranged so that it is responsive only to transverse vibration of the workpiece, that is, movement of the workpiece 1 in a plane normal to the axis of rotation and passing through the center of gravity of the workpiece. The dynamic vibration responsive pickup N is shown in a position wherein it is responsive only to pivotal movement of the workpiece about its geometric center.

While the pickups M and N of the apparatus shown in FIGURES 1 and 2 are physically located remote from the position shown in FIGURE 3, the suspension construction of the apparatus of FIGURE 1 insures that the pickups respond the same as if located in FIGURE 3.

Two correction planes equally spaced from the center of the workpiece and normal to the axis of rotation of the same, are shown in FIGURE 3. In the case of a wheel and tire assembly, these correction planes would normally pass through the edges of the wheel rims where correction weights are usually applied.

Figure 4:
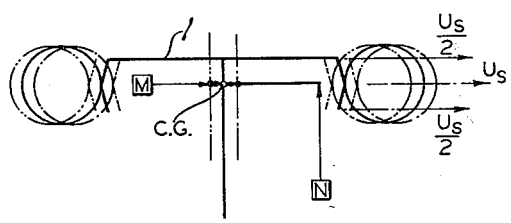
FIGURE 4 is similar to FIGURE 3 showing the case of wheel with pure static unbalance.

FIGURE 4 is similar to FIGURE 3 and illustrates the movement of a wheel and tire assembly workpiece having pure static unbalance represented by a force vector $U_s$. The pickup M responds to vibrational movement of the wheel and tire assembly, which movement is shown exaggerated by dashed lines in FIGURE 4. By definition the static unbalance force $U_s$ passes through the center of gravity of the wheel and in the two correction planes there exists components of this static unbalance consisting of $$\frac{U_s}{2}$$

in each plane. The voltage generated by the pickup M is proportional to the magnitude of $U_s$ and has a phase angle $\angle S$ that corresponds with the angular relationship between the unbalance and a fixed point on the workpiece. By comparing the angle $\angle S$ with a reference phase angle such as might be generated by a photocell pickup, magnetic pickup, etc., the angle between the static unbalance and the reference point can be determined.

Figure 5:
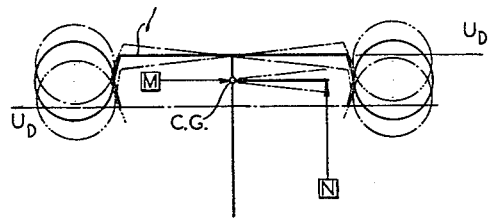
FIGURE 5 is similar to FIGURE 3 and shows a case of pure dynamic unbalance.

FIGURE 5 is similar to FIGURE 3, however, in this case there is shown the motion of a wheel and tire assembly having pure dynamic unbalance. This dynamic unbalance is in the form of a couple tending to pivot the assembly about the center of gravity and can be represented by a force vector $U_D$ in the correction planes shown in FIGURE 5. Here the pickup N will generate a voltage proportional to the value of $U_D$ and a phase angle $\angle D$ which corresponds to the angle location of the dynamic unbalance with respect to a fixed reference point. Thus the total system utilizes a static pickup M which generates a voltage $U_S \angle S$ and a dynamic pickup N generating a voltage $U_D \angle D$.

Figure 6:
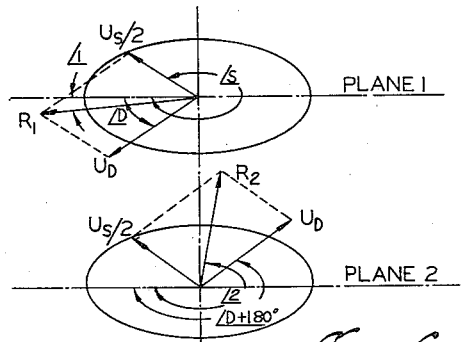
FIGURE 6 illustrates the dynamic and static forces in each correction plane and their vectorial resultant.

There is shown in FIGURE 6 a vectorial representation of the static and dynamic forces with resultant combined forces that are equal to the correction that must be made in each plane. Thus if a particular workpiece being checked has a static unbalance $U_S$ at $\angle S$, the component $$\frac{U_S}{2}$$

in plane 1 can be represented by the vector $$\frac{U_S}{2}$$

as shown. Similarly the dynamic unbalance $U_D$ having a phase angle $\angle D$ with respect to the same reference point can be represented by the vector $U_D$. These vectors can be combined to produce a resultant vector $R_1$ having a $\angle 1$. Thus a correction weight having a value $R_1$ placed at $\angle 1$ with respect to the reference point on the workpiece will correct for both the static and dynamic unbalance force components present in plane 1. Similarly in plane 2 the static unbalance component can be represented by the vector $$\frac{U_S}{2}$$

which will have the same magnitude and angle as that in plane 1. However, the dynamic unbalance force $U_D$ in plane 2 is in the opposite direction from that of plane 1 and hence has 180° phase relationship to $U_D$ of plane 1. The static and dynamic vectors in plane 2 combine to form a resultant $R_2$ at $\angle 2$. A correction weight equivalent to the magnitude of vector $R_2$ and placed at $\angle 2$ relative to the reference point on the workpiece will correct for the static and dynamic unbalance force components in plane 2. Thus from the information obtained from the two pickups M and N, it is possible to determine the amount and location of corrective weights necessary in each of two equally spaced planes to completely balance the workpiece or wheel and tire assembly.

Figure 7:
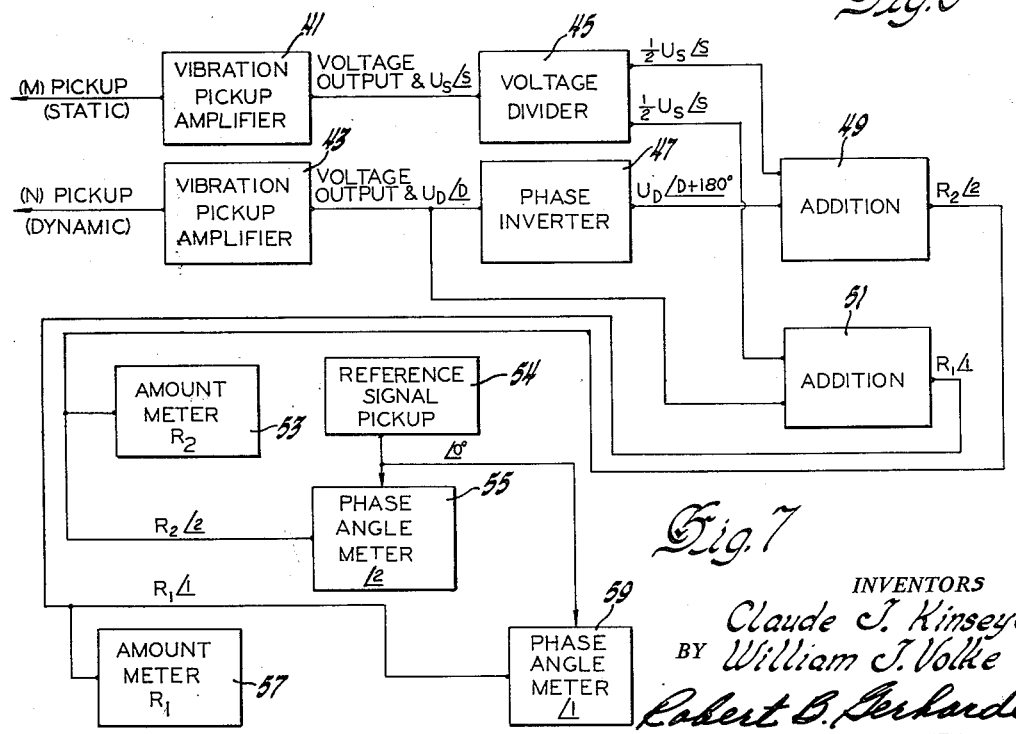
FIGURE 7 illustrates, in block diagram form, a suitable system for combining the vibration pickup outputs to obtain direct angle and amount correction values.

FIGURE 7 shows, in block diagram arrangement, a measurement system wherein the outputs of the static pickup M and dynamic pickup N can be combined to provide a direct reading on meters of the amounts and angles of the correction weights for each plane. As shown the output from the pickup M is amplified by an amplifier 41 without change of phase. This amplified output is split into two equal signals $$\frac{U_S}{2}$$

by a voltage divider 45. These signals have the same angular relationship $\angle S$ with respect to some fixed reference point on the workpiece. The output from the dynamic pickup N is amplified by an amplifier 43 whose output is fed into a phase inverter 47 which provides a signal having an amplitude proportional to $U_D$ and a phase angle displaced 180° from that of the signal $U_D \angle D$. This phase inverted signal $$U_D \underline{/D+180°}$$

is combined with the component $$\frac{U_s}{2} \underline{/S}$$

by addition network 49 to provide an output signal $R_2 \angle 2$. The amplitude of this output is measured by an amount meter 53 which can be calibrated to directly indicate the value of correction necessary in plane 2.

The output from the addition network 49 is also fed to a phase angle meter 55 which compares the phase angle of the resultant signal $R_2 \angle 2$ with the phase angle of a reference signal generated by a pickup 54. The pickup 54 may be of any suitable form such as a photocell, magnetic pickup, or any other device which will provide a one per revolution pulse or signal which has a fixed angular relationship to a fixed point on the workpiece.

As seen in FIGURE 7, the amplified output $U_D \angle D$ from the amplifier 43 is combined with the component $$\frac{U_s}{2} \underline{/S}$$

by an addition network 51 to provide a combined resultant signal $R_1 \angle 1$. This combined signal is connected to an amount meter 57 which measures the amplitude of the signal $R_1 \angle 1$, and hence the value of correction weight necessary in correction plane 1. The combined signal $R_1 \angle 1$ is also connected to a phase angle meter 59 which compares the phase angle of the signal $R_1 \angle 1$ with the reference signal from the pickup 54. Thus the amount and angular position of the correction weights for the two correction planes can be read directly from the meters.

Other arrangements than that shown in FIGURE 7 could be utilized to provide the correction information from the signals generated by pickups M and N. Likewise other apparatus than that shown in FIGURES 1 and 2 could be utilized to provide two signals representing pure dynamic and pure static unbalance forces acting on the workpiece.

It will be seen that we have provided a method as well as a suitable apparatus for easily determining correction weights and positions thereof necessary to correct for dynamic and static unbalance in a rotating member. These values can be determined simultaneously with a single compact apparatus.

It will be obvious to those skilled in the art that other arrangement, applications and uses of the invention may be made, and these arrangements are deemed to be within the scope of the invention, which is to be limited only by the following claims.

We claim:
1. In an apparatus for measuring both the dynamic and the static unbalance in a rotatable wheel type assembly; the combination including an adapter for holding the assembly; means for rotating the adapter and the assembly about its axis; the rotating means including a drive motor having a flexible drive connection with the adapter; a support member concentrically arranged relative to the adapter and the assembly for rotatably supporting the adapter; a flexible suspension for the member; the suspen- sion including a flexible diaphragm located in a plane passing through the center of gravity of the assembly and perpendicular to the axis of rotation of the assembly for allowing pivotal movement of the member and the assembly about the center of gravity of the assembly and a spring for allowing movement of the diaphragm, the adapter, the member, and the assembly all in a radial direction with respect to the assembly axis of rotation; first vibration pickup means associated with the member for providing a first signal proportional to the amplitude of pivotal movement of the adapted and the assembly about its center of gravity, second vibration pickup means associated with the spring for providing a second signal proportional to the amplitude of radial movement of the adapter, the member, and the assembly; reference signal means providing a reference signal indication of the angular position of a fixed point on the assembly; and combining means including means for adding the first signal to one-half of the second signal to provide a third signal, means for inverting the phase of the first signal to produce a fourth signal, means for adding the fourth signal to one-half of the second signal to provide a fifth signal, first amount means for indicating the maximum amplitude of the third signal, first angle means for comparing the phase of the third signal with the reference signal, second amount means for indicating the maximum amplitude of the fifth signal, and second angle means for comparing the phase of the fifth signal with the reference signal, thus simultaneously providing two plane correction information for dynamically and statically balancing the assembly.

2. In an apparatus for measuring both the dynamic and the static unbalance in a wheel type assembly; the combination including an adapter for holding the assembly; means rotating the adapter about its axis; the rotating means including a drive motor having a universal jointed connection with the adapter; a support member arranged concentrically with the adapter and the assembly for rotatably supporting the adapter; a flexible suspension for the support member; the suspension including a flexible diaphragm located in a plane passing through the center of gravity of the assembly and perpendicular to the axis of rotation of the assembly, the diaphragm allowing pivotal movement of the support member and the assembly about the center of gravity of the assembly, and a spring having one end fixed and the other end arranged relative to the diaphragm for allowing movement of the diaphragm, the adapter, the supporting member, and the assembly all in a radial direction transverse to the assembly axis of rotation; first vibration pickup means associated with the supporting member for providing a first signal proportional to the amplitude of pivotal movement of the adapter and the assembly about its center of gravity, second vibration pickup means associated with the spring for providing a second signal proportional to the amplitude of radial movement of the adapter, the supporting member, and the assembly; and means for combining the first and second signals to simultaneously provide two plane correction in formation to dynamically and statically balance the assembly.

References Cited in the file of this patent

UNITED STATES PATENTS

| | | |
|---|---|---|
| 2,383,405 | Merrill et al. | Aug. 21, 1945 |
| 2,700,892 | Lowe | Feb. 1, 1955 |
| 3,044,304 | Ten Bosch et al. | July 17, 1962 |

FOREIGN PATENTS

| | | |
|---|---|---|
| 612,357 | Great Britain | Nov. 11, 1948 |
| 666,898 | Great Britain | Feb. 20, 1952 |

UNITED STATES PATENT OFFICE
CERTIFICATE OF CORRECTION

Patent No. 3,130,587                                                  April 28, 1964

Claude J. Kinsey et al.

It is hereby certified that error appears in the above numbered patent requiring correction and that the said Letters Patent should read as corrected below.

Column 3, line 19, after "planes" insert -- as --; column 4, line 62, for "arrangement" read -- arrangements --; column 5, line 11, for "adapted" read -- adapter --; column 6, line 24, for "in formation" read -- information --.

Signed and sealed this 18th day of August 1964.

(SEAL)
Attest:

ERNEST W. SWIDER                                        EDWARD J. BRENNER
Attesting Officer                                            Commissioner of Patents